(12) United States Patent
Wu (10) Patent No.: US 10,177,580 B2
(45) Date of Patent: Jan. 8, 2019

(54) ENERGY STORAGE DEVICE STACK BALANCING USING SWITCHED INDUCTOR BACKGROUND

(71) Applicant: LINEAR TECHNOLOGY CORPORATION, Milpitas, CA (US)

(72) Inventor: Albert M. Wu, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 92 days.

(21) Appl. No.: 15/135,359

(22) Filed: Apr. 21, 2016

(65) Prior Publication Data
US 2017/0310127 A1    Oct. 26, 2017

(51) Int. Cl.
| | | |
|---|---|---|
| H01M 10/44 | (2006.01) | |
| H01M 10/46 | (2006.01) | |
| H02J 7/00 | (2006.01) | |
| H02J 7/34 | (2006.01) | |

(52) U.S. Cl.
CPC ............. *H02J 7/0016* (2013.01); *H02J 7/345* (2013.01)

(58) Field of Classification Search
CPC ...... H02J 7/0013; H02J 7/1423; H02J 7/0014; H02J 7/0019
USPC .................................. 320/116, 117, 118, 119
See application file for complete search history.

(56) References Cited

U.S. PATENT DOCUMENTS

| | | | |
|---|---|---|---|
| 7,528,587 B2 | 5/2009 | Wu et al. | |
| 2008/0055940 A1 | 3/2008 | Lawson et al. | |
| 2010/0109608 A1* | 5/2010 | Buono | H02J 7/0019 320/121 |
| 2011/0267005 A1* | 11/2011 | Gollob | H02J 7/0014 320/116 |
| 2013/0134924 A1 | 5/2013 | Kanakasabai | |
| 2014/0152278 A1 | 6/2014 | Shepard et al. | |
| 2014/0340022 A1* | 11/2014 | Kang | H02J 7/0014 320/103 |
| 2015/0340886 A1* | 11/2015 | Sung | H01M 10/441 320/118 |

FOREIGN PATENT DOCUMENTS

WO    2012/143396 A1    10/2012

OTHER PUBLICATIONS

Office Action Taiwanese Patent Application No. 105113140 dated May 3, 2017 with English translation.

* cited by examiner

*Primary Examiner* — Edward Tso
(74) *Attorney, Agent, or Firm* — Schwegman Lundberg & Woessner, P.A.

(57) ABSTRACT

An energy storage stack balancing circuit may balance a set of serially connected energy storage devices. An electronic switching system may control the delivery of energy into and out of the inductor. A controller may control the electronic switching system so as to cause energy to be transferred: from one of the energy storage devices into the inductor and then out of the inductor and into a different one, a subset, or all of the energy storage devices; or from a subset of the energy storage devices into the inductor and then out of the inductor and into one, a different subset, or all of the energy storage devices; or from all of the energy storage devices into the inductor and then out of the inductor and into one or a subset the energy storage devices.

24 Claims, 8 Drawing Sheets

ENERGY STORAGE DEVICE STACK BALANCING USING SWITCHED INDUCTOR

BACKGROUND

TECHNICAL FIELD

This disclosure relates to balancing stored energy in a battery or capacitor stack or other type of energy storage device stack.

DESCRIPTION OF RELATED ART

A stack of batteries or capacitors may be connected in series to form a power supply. The stack may have a top voltage VT and a bottom voltage VB. In between VT and VB, there may be a series of voltages drops from top to bottom of V1, V2, ... VN. These in between voltage points may correspond to terminals joining the consecutive batteries or capacitors making up the stack.

It may be desirable to balance the energy in the stack so that each cell has the same amount of stored energy. To facilitate this, energy may be moved from one cell, such as the cell between V5-V6, and distributed across the entire stack from VT-VB. The opposite operation may also be useful, that is taking energy from the entire stack VT-VB and placing it into the cell between V5-V6.

Similarly, the balancing of energy may be accomplished on a per cell basis where the energy is moved from one cell and distributed across the stack from VT-VB. This operation can also be reversed, that is taking energy from the stack VT-VB and placing it into a particular cell.

It may be important to transfer this energy efficiently, so that very little energy is lost in the transfer. It may also be helpful to accomplish this energy transfer using simple, compact, and inexpensive circuitry, without a large or expensive transformer. Existing approaches may not meet these goals, but may instead require transformers in a fly-back configuration to move energy from a single battery or capacitor back into the stack and vice-versa. Examples of such circuits include the LT8584 and LTC3300 ICs sold by Linear Technologies. (The LT8584 moves energy in only one-direction, while the LTC3300 can move energy in both directions.)

Another approach may use a buck converter that takes energy from one cell and moves it only to the cell above or below the one cell. An example of a circuit that uses this approach is the bq78PL116 sold by Texas Instruments. However, moving charge from one cell to another cell several cells away may incur a large efficiency penalty due to the several power conversion steps that may be needed.

Passive balancing methods can use a FET and a resistor to dissipate energy from a particular cell. However, this approach may dissipate energy within the resistor and may not be able to increase the energy stored in a cell.

Another approach uses various configurations of charge pumps to move charge from one cell to another place. However, it can be difficult to move much energy in this way due to the higher output impedance of charge pumps. This approach can also be very complicated to control and build.

SUMMARY

An energy storage stack balancing circuit may balance a set of serially connected energy storage devices. An electronic switching system may control the delivery of energy into and out of the inductor. A controller may control the electronic switching system so as to cause energy to be transferred: from one of the energy storage devices into the inductor and then out of the inductor and into a different one, a subset, or all of the energy storage devices; or from a subset of the energy storage devices into the inductor and then out of the inductor and into one, a different subset, or all of the energy storage devices; or from all of the energy storage devices into the inductor and then out of the inductor and into one or a subset the energy storage devices.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A DC/DC switching regulator topology may be used to balance a serially connected stack of energy storage elements, such as batteries or capacitors. A single inductor and four switches may be used for each cell in the stack. Alternatively, a more complex switching arrangement may be used with only a single inductor in the entire circuit.

Figure 1:
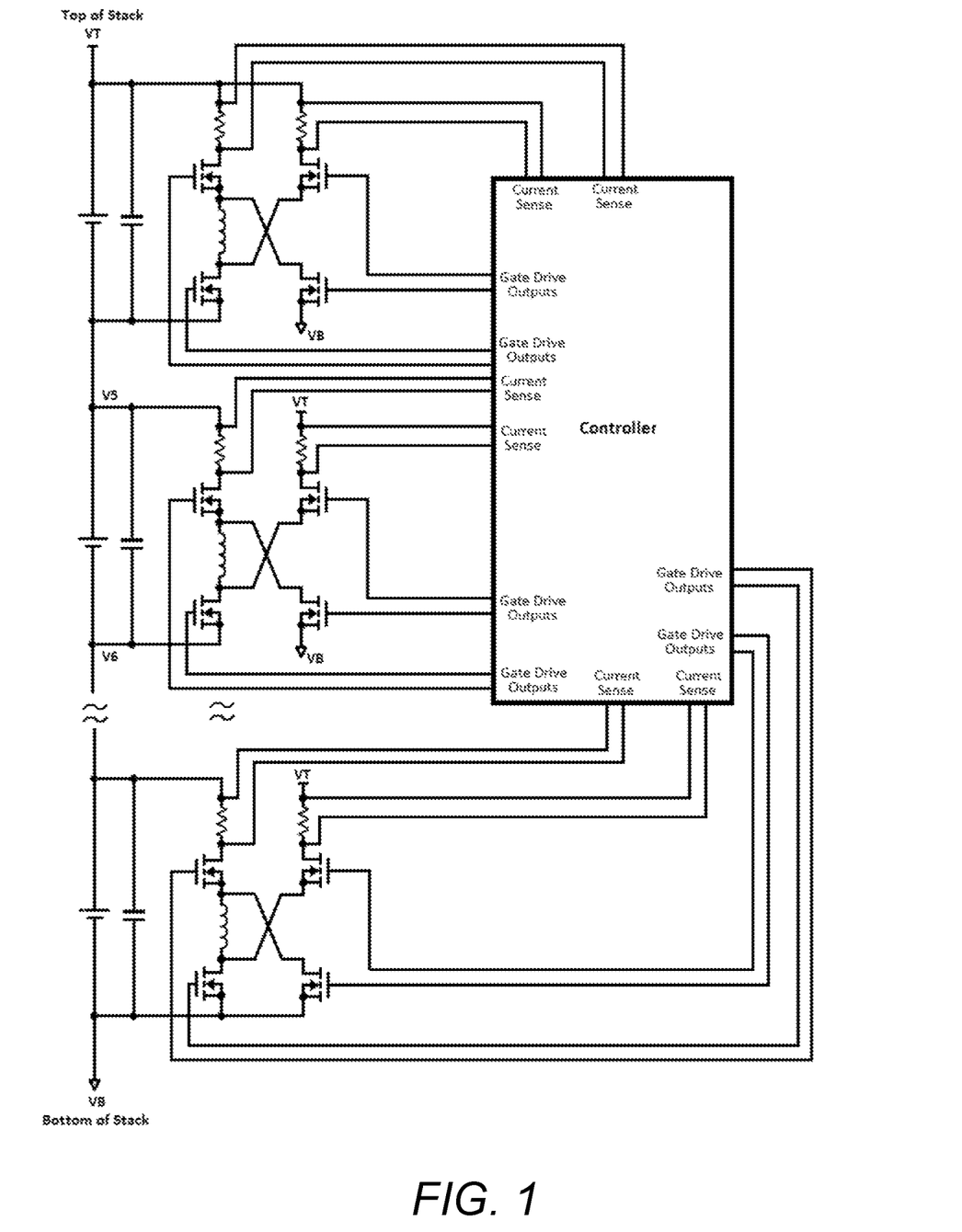
FIG. 1 illustrates an example of an energy storage stack balancing circuit.

FIG. 1 illustrates an example of an energy storage stack balancing circuit. This circuit can move energy from the entire battery stack to one cell in the stack and vice-versa. It may not need a transformer to work, which may decrease costs. The stack may be a set of energy storage elements connected in series.

As illustrated in FIG. 1, a balancing circuit may include one or more power converter units, each having an inductor, four switches, current sense circuitry, and a portion of a controller to control the timing of the switches. In FIG. 1, each energy storage element may have one power converter unit associated with it. A common controller may sense the switch currents by detecting the voltage across a series resistor and may control the timing of the switches to effectuate energy transfer. This controller, in this case, may be shared amongst all the cells in the stack, but this is not required. There could instead be multiple controllers, each controlling one or more of the power converter units.

The controller may cause energy to be moved from a single cell in the stack to the entire stack. The controller may instead or in addition during a different time period cause energy to be moved from the stack to the single cell. The direction in which the controller may cause energy to be moved may depend on where energy may need to be moved to effectuate optimum balancing, as detected by energy level sensors (not shown).

This topology illustrated may allow energy to be built up within the inductor as it is taken from the cell in question. This energy may then be put into the entire battery stack. The operation can be reversed, allowing energy to be taken from the entire stack and moved to any particular cell. The need for an expensive and bulky transformer may be eliminated. Additionally, the power that can be processed can be high, unlike the typical charge pump method. Control of the power flow may also be very simple because each cell can be controlled independently from the other cells. Power conversion may be direct: energy that is being moved may only be converted one time, from cell to stack or from stack to cell. Moving energy from cell to adjacent cell again and again may not be required. Hence, the power efficiency of this approach may be excellent.

Figure 2A:
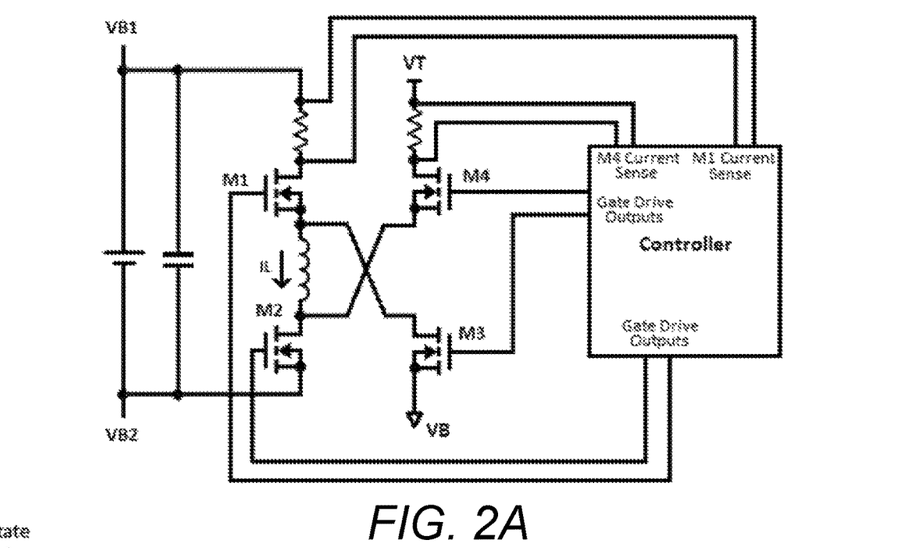
FIG. 2A illustrates one of the cells and its related switching circuitry that is shown in FIG. 1.
Figure 2B:
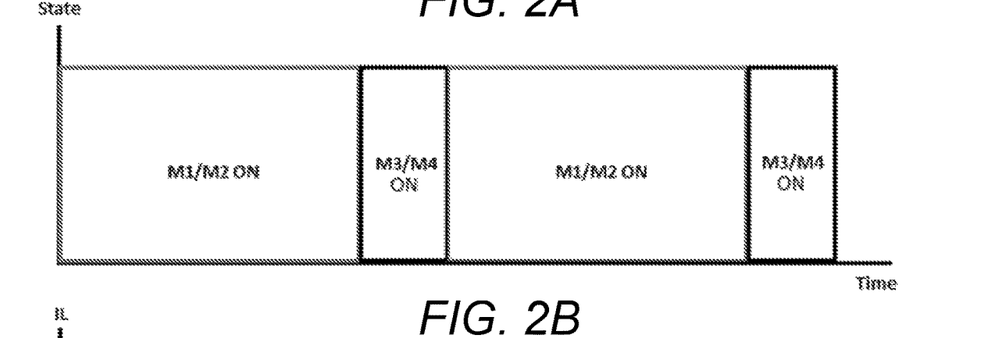
FIG. 2B is a graph illustrating an example of switch timing that may be implemented by the controller for this section of circuitry that causes energy to be moved from the cell shown in FIG. 2A to the top and bottom of the entire energy storage stack shown in FIG. 1.
Figure 2C:
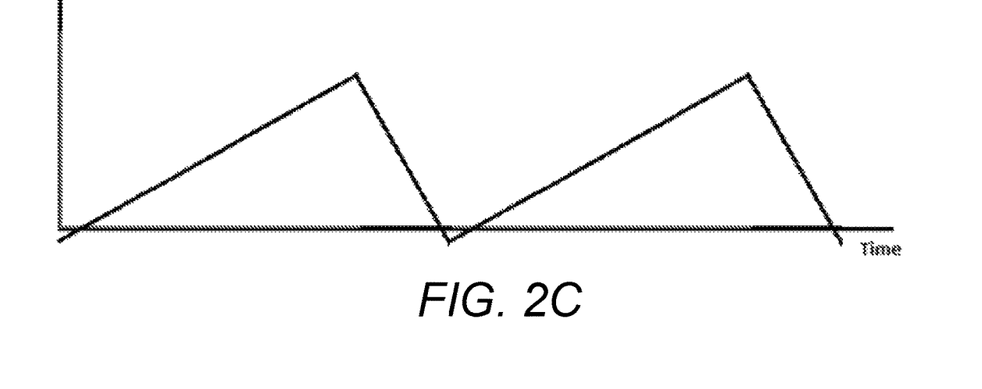
FIG. 2C is a graph of an example of current that may flow in the inductor shown in FIG. 2A based on the switch timing shown in FIG. 2B.

FIG. 2A illustrates one of the cells and its related switching circuitry that is shown in FIG. 1. FIG. 2B is a graph illustrating an example of switch timing that may be implemented by the controller for this section of circuitry that causes energy to be moved from the cell shown in FIG. 2A to the top and bottom of the entire energy storage stack shown in FIG. 1. FIG. 2C is a graph of an example of current that may flow in the inductor shown in FIG. 2A based on the switch timing shown in FIG. 2B.

FIG. 2B illustrates boundary mode operation and discharging of the cell. Continuous conduction mode could be used instead. The timing of FETs M1-M4 may be controlled in a way to cause a net positive inductor current to exist. Positive inductor current may be defined as current flowing from the top connection to the bottom connection of the inductor. This may result in a net discharge of the cell, and this energy may be moved to the top and bottom of the stack, VT-VB.

Many different ways of controller the timing of the switches can be implemented. A boundary mode technique is shown. Here M1/M2 may be turned on and by detecting the current in the drain of M1 the current in the inductor is indirectly measured. When the positive level of the inductor current reaches a desired level, the FETs M1/M2 may be turned off and FETs M3/M4 may be turned on. The current in the inductor may decrease and this level may be indirectly monitored by measuring the drain current of M4. When this level reaches a negative level, then M3/M4 may be turned off and M1/M2 may be turned back on. The reason for the negative level in the inductor current may be to create a soft switching transition when M1/M2 turn back on. This may improve power conversion efficiency.

In some applications, M1/M2 may not be switched on followed by M3/M4 being switched on. Rather, M1/M2 might be switched on, followed by M1/M4 being switched on, followed by M3/M4 being switched on, or there might be some other permutation.

Figure 3A:
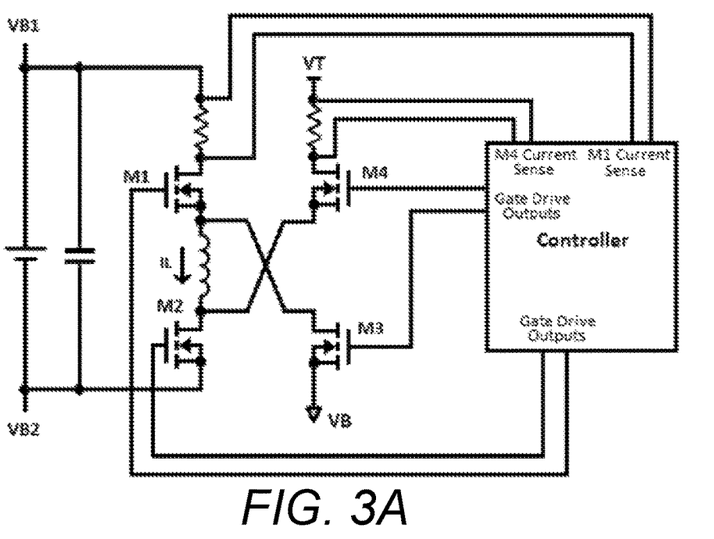
FIG. 3A illustrates one of the cells and its related switching circuitry that is shown in FIG. 1.
Figure 3B:
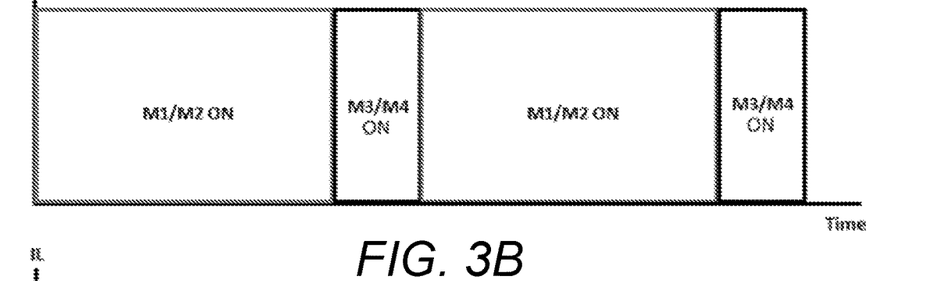
FIG. 3B is a graph illustrating an example of switch timing that may be implemented by the controller for this section of circuitry when operating in boundary mode that causes energy to be moved from the top and bottom of the entire energy storage stack shown in FIG. 1 to the cell shown in FIG. 3A.
Figure 3C:
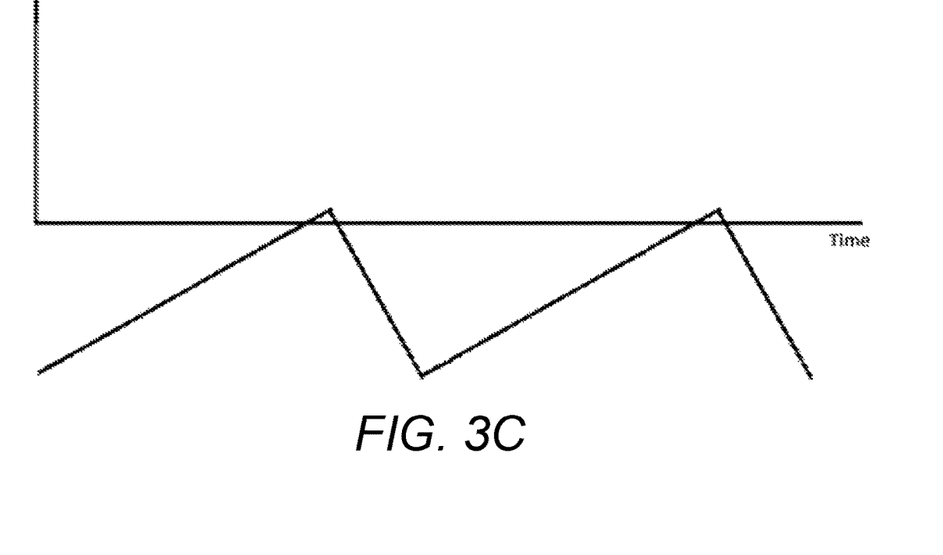
FIG. 3C is a graph of an example of current that may flow in the inductor shown in FIG. 3A based on the switch timing shown in FIG. 3B.

FIG. 3A illustrates one of the cells and its related switching circuitry that is shown in FIG. 1. FIG. 3B is a graph illustrating an example of switch timing that may be implemented by the controller for this section of circuitry when operating in boundary mode that causes energy to be moved from the top and bottom of the energy storage stack shown in FIG. 1 to the cell shown in FIG. 3A. FIG. 3C is a graph of an example of current that may flow in the inductor shown in FIG. 3A based on the switch timing in FIG. 3B. The timing of FETs M1-M4 may be controlled in a way to cause a net negative inductor current to exist. This may result in a net charging of the cell, and this energy may be moved from the top and bottom of the stack, VT-VB, into the cell.

Many different ways of controller the timing of the switches can be implemented. A boundary mode technique is shown. Here M3/M4 may be turned on and monitoring the current in the drain of M4 indirectly measures the current in the inductor. When the negative level of the inductor current reaches a desired level, FETs M3/M4 may be turned off and FETs M1/M2 may be turned on. The current in the inductor may increase and this level may be monitored indirectly by measuring the drain current of M1. When this level reaches a positive level, then M1/M2 may be turned off and M3/M4 may be turned back on. The reason for the positive level in the inductor current may be to create a soft switching transition when M3/M4 turn back on. This may improve power conversion efficiency.

Figure 4A:
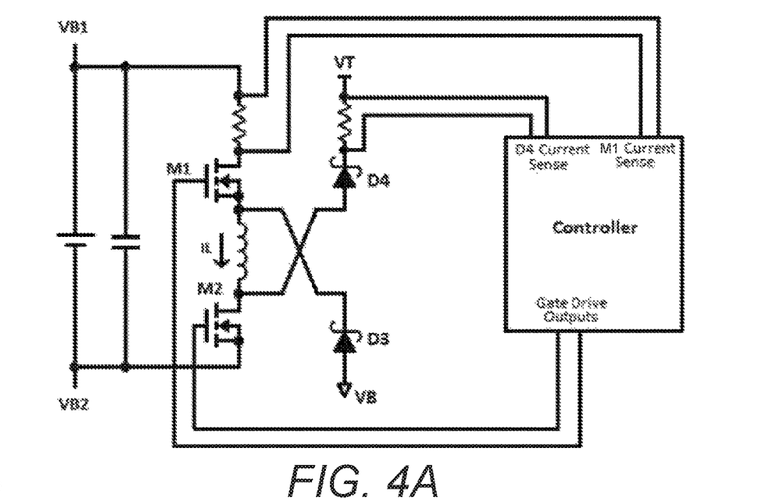
FIG. 4A illustrates an example of a modified version of one of the cells shown in FIG. 1 in which two of the FETs are replaced with diodes.
Figure 4B:
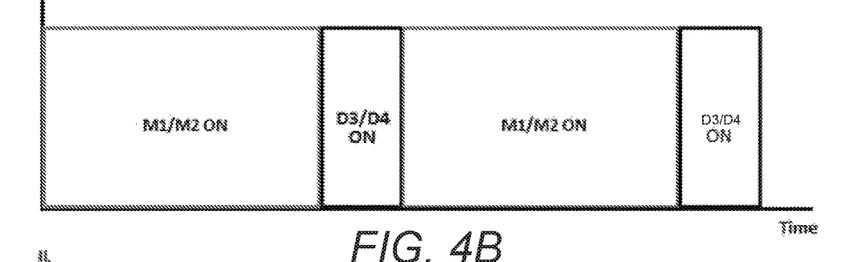
FIG. 4B is a graph illustrating an example of switch timing that may be implemented by the controller for this section of circuitry that causes energy to be moved from the cell shown in FIG. 4A to the top and bottom of the entire energy storage stack shown in FIG. 1.
Figure 4C:
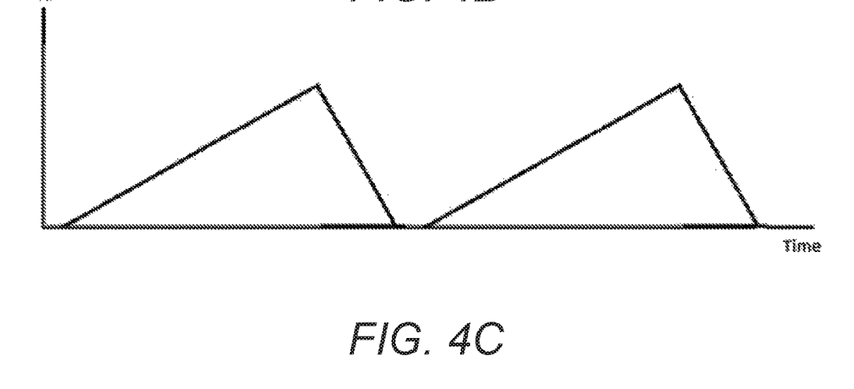
FIG. 4C is a graph of an example of current that may flow in the inductor shown in FIG. 4A based on the switch timing shown in FIG. 4B.

FIG. 4A illustrates an example of a modified version of one of the cells shown in FIG. 1 in which two of the FETs are replaced with diodes. FIG. 4B is a graph illustrating an example of switch timing that may be implemented by the controller for this section of circuitry that causes energy to be moved from the cell shown in FIG. 4A to the top and bottom of the entire energy storage stack shown in FIG. 1. FIG. 4C is a graph of an example of current that may flow in the inductor shown in FIG. 4A based on the switch timing shown in FIG. 4B. This may create a one directional circuit where energy is removed from a cell and placed to the top and bottom of a stack. The reverse operation may not be possible.

FIG. 4 illustrates the case in which only a single direction of power may be needed; two of the power switches may be replaced with diodes. This may reduce the cost of the system. For example, FETs M3 and M4 in FIG. 3 could be replaced with diodes. The resulting circuit may only be able to take power from a cell and moving it into a stack, not vice versa.

Figure 5A:
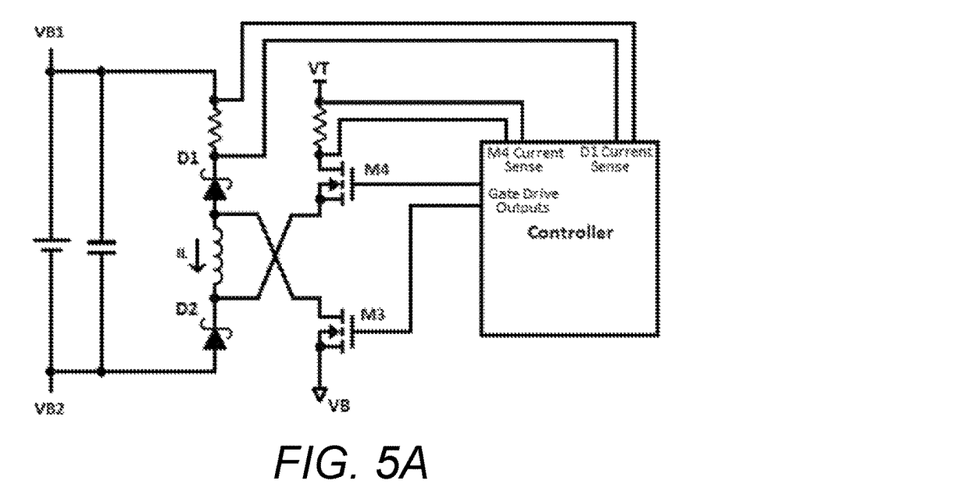
FIG. 5A illustrates an example of modified version of one of the cells in FIG. 1 in which the other two FETs are replaced with diodes instead of the ones replaced in FIG. 4.
Figure 5B:
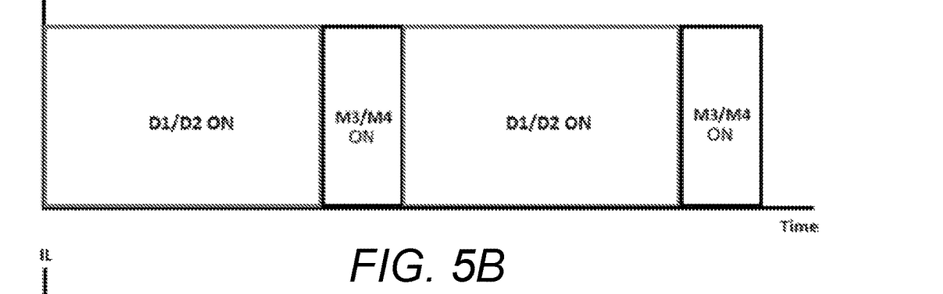
FIG. 5B is a graph illustrating an example of switch timing that may be implemented by the controller for this section of circuitry that causes energy to be moved from the top and bottom of the entire energy storage stack shown in FIG. 1 to the cell shown in FIG. 5A.
Figure 5C:
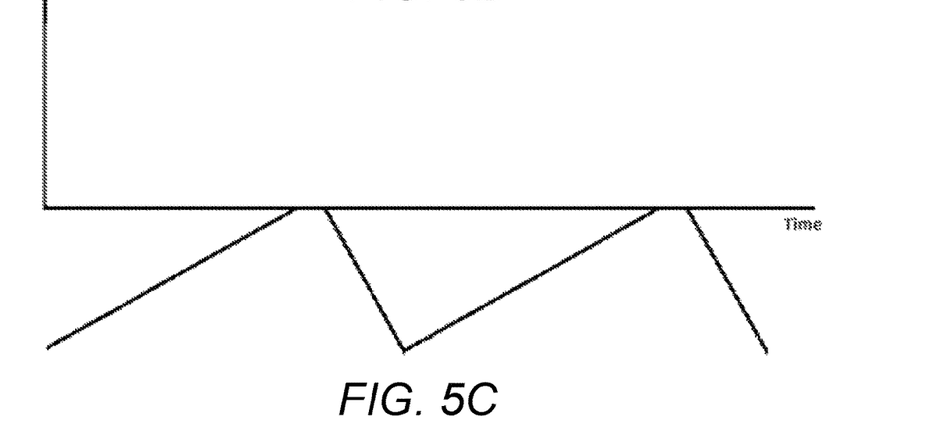
FIG. 5C is a graph of an example of current that may flow in the inductor shown in FIG. 5A based on the switch timing shown in FIG. 5B.

FIG. 5 illustrates an example of modified version of one of the cells in FIG. 1 in which the other two FETs are replaced with diodes instead of the ones replaced in FIG. 4. FIG. 5B is a graph illustrating an example of switch timing that may be implemented by the controller for this section of circuitry that causes energy to be moved from the top and bottom of the entire energy storage stack shown in FIG. 1 to cell shown in FIG. 5A. FIG. 5C is a graph of an example of current that may flow in the inductor shown in FIG. 5A based on the switch timing shown in FIG. 5B. This may create a one directional circuitry where energy can only be removed from the stack and placed into a given cell. The reverse operation may not possible.

As illustrated in FIG. 5A, M1 and M2 in FIG. 3 could be replaced with diodes, while M3 and M4 in FIG. 3 remain FETs. Now, power may only be taken from the stack and placed into any particular cell.

Figure 6:
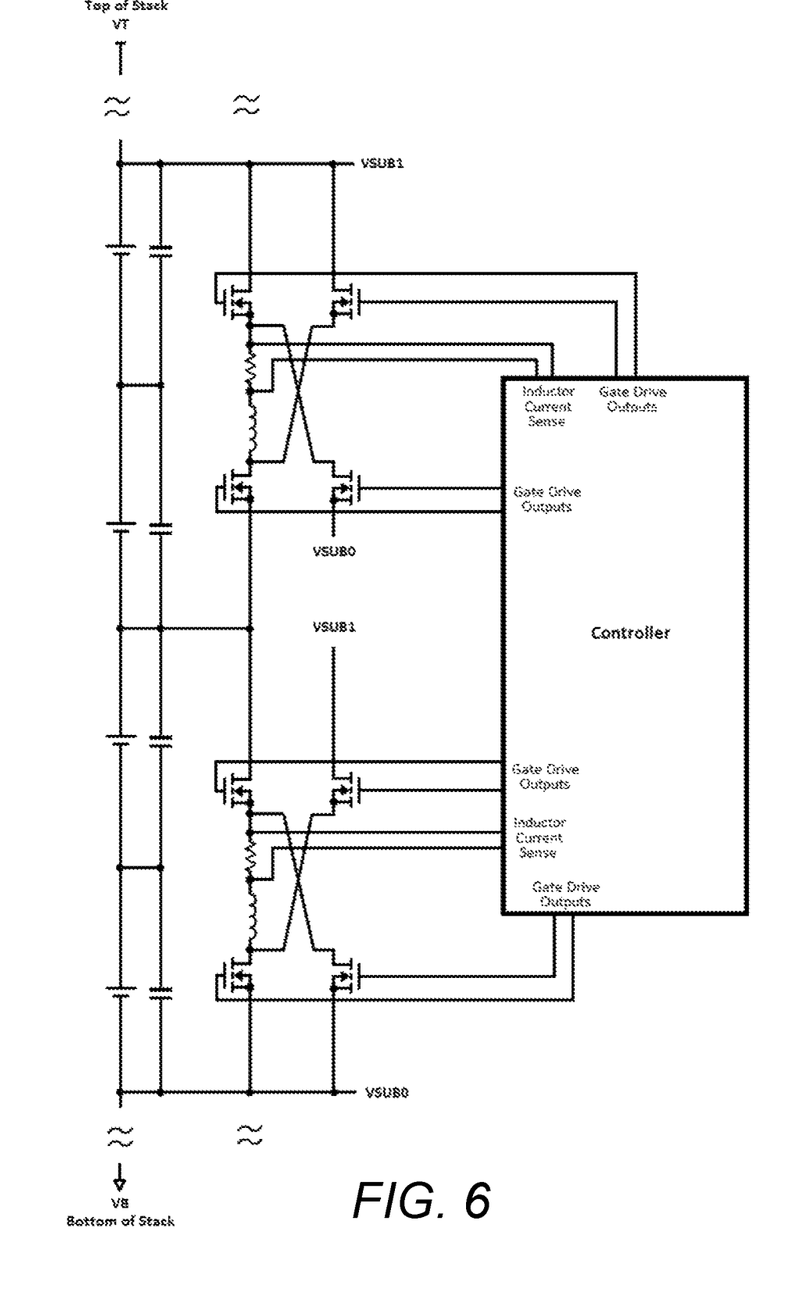
FIG. 6 illustrates an example of an energy storage stack balancing circuit in which energy may be taken from two adjacent cells and placed across a sub-set of four adjacent cells and vice-versa.

FIG. 6 illustrates an example of an energy storage stack balancing circuit in which energy may be taken from two adjacent cells and placed across a sub-set of four adjacent cells and vice-versa. FIG. 6 illustrates the case where the switches connecting the inductor to an individual cell may instead be configured to connect the inductor across a subset of the stacked cells during either the removal and/or addition of energy to the subset, rather than across only a single cell. Likewise, the switches that would normally connect the inductor to the stack may instead be configured to connect to a subset of cells. This may enable the controller to transfer energy in either direction between a single cell and a subset of the cells, between a subset of the cells and the entire stack, or between one subset of the cells and a different subset. The particular case shown in FIG. 6 shows the transfer of energy from a two cell subset to a four cell subset or vice versa. The two cell subset is shown as the voltage between the top two cells or the bottom two cells. The four cell subset is shown as the voltage between the four cells, VSUB1-VSUB0.

In another example, the right side two switches or FETs may not be connected to the battery stack itself, but to some other voltage source. This other voltage source may need a positive voltage higher than or equal to any voltages within the power converter unit. The negative terminal of this other voltage source may also need to be less than or equal to any voltages within the power converter unit.

The circuit may not need to merely take energy from one cell and place it into the whole stack. Instead, the circuit could be configured to take energy from two or more cells simultaneously and place it elsewhere.

The approach that has been described may instead be used in connection with a stack of capacitors or super-capacitors. The energy storage devices could instead be of another type, such as fuel cells. The topology isn't limited to energy storage devices. The topology may allow power conversion between an input voltage source or supply to an output voltage source or supply with the input voltages (positive and negative terminals) encompassed within the output voltages (positive and negative terminals). For example, the input voltage terminals could be at 10V and 7V, while the output voltage terminals could be at 11V and 2V. The input voltage terminals may be encompassed (within) the output voltage terminal voltages.

Figure 7:
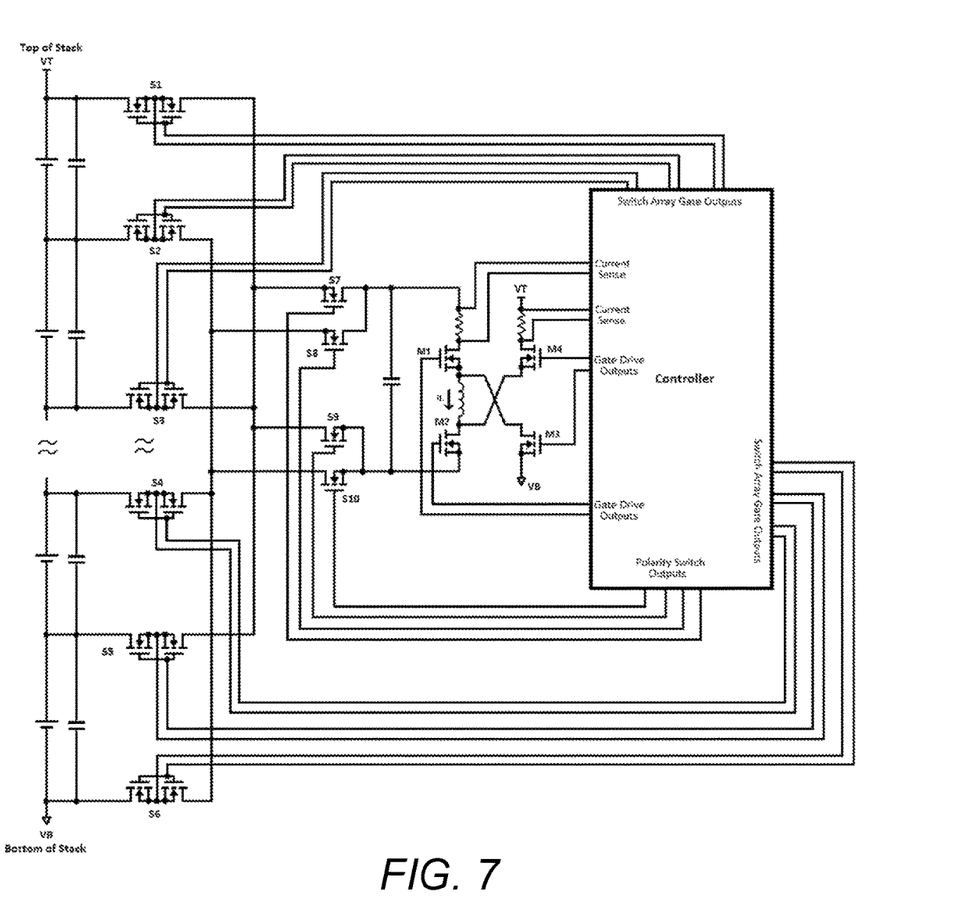
FIG. 7 illustrates an example of an energy storage stack balancing circuit in which there may be only one power converter unit, formed by M1-M4, an inductor, and a controller that controls the switches.

Another variation of the use of the invention is shown in FIG. 7. FIG. 7 illustrates an example of an energy storage stack balancing circuit in which there may be only one power converter unit, formed by M1-M4, the inductor, and the controller that controls the switches. A switch array may be used to selectively place this power converter unit in parallel to whichever energy storage element is of interest. Thus, this power converter unit may be time multiplexed between the cells as needed to properly balance the cells.

Here, one power converter unit may be shared amongst a number of cells or energy storage devices. An array of switches or FETs may be controlled to selectively place the power converter unit in parallel to the desired cell or energy storage device. For example, if the top most cell is desired, then switches S1, S2 may be turned ON, while S3-S6 may be OFF. Polarity switches S7 and S10 may be ON, while S8 and S9 may be OFF. This combination of switches being ON or OFF may place the power converter unit in parallel to the top-most cell in the figure. Alternatively, any cell in the figure can be selected by proper choice of switch ON and OFF states.

Figure 8:
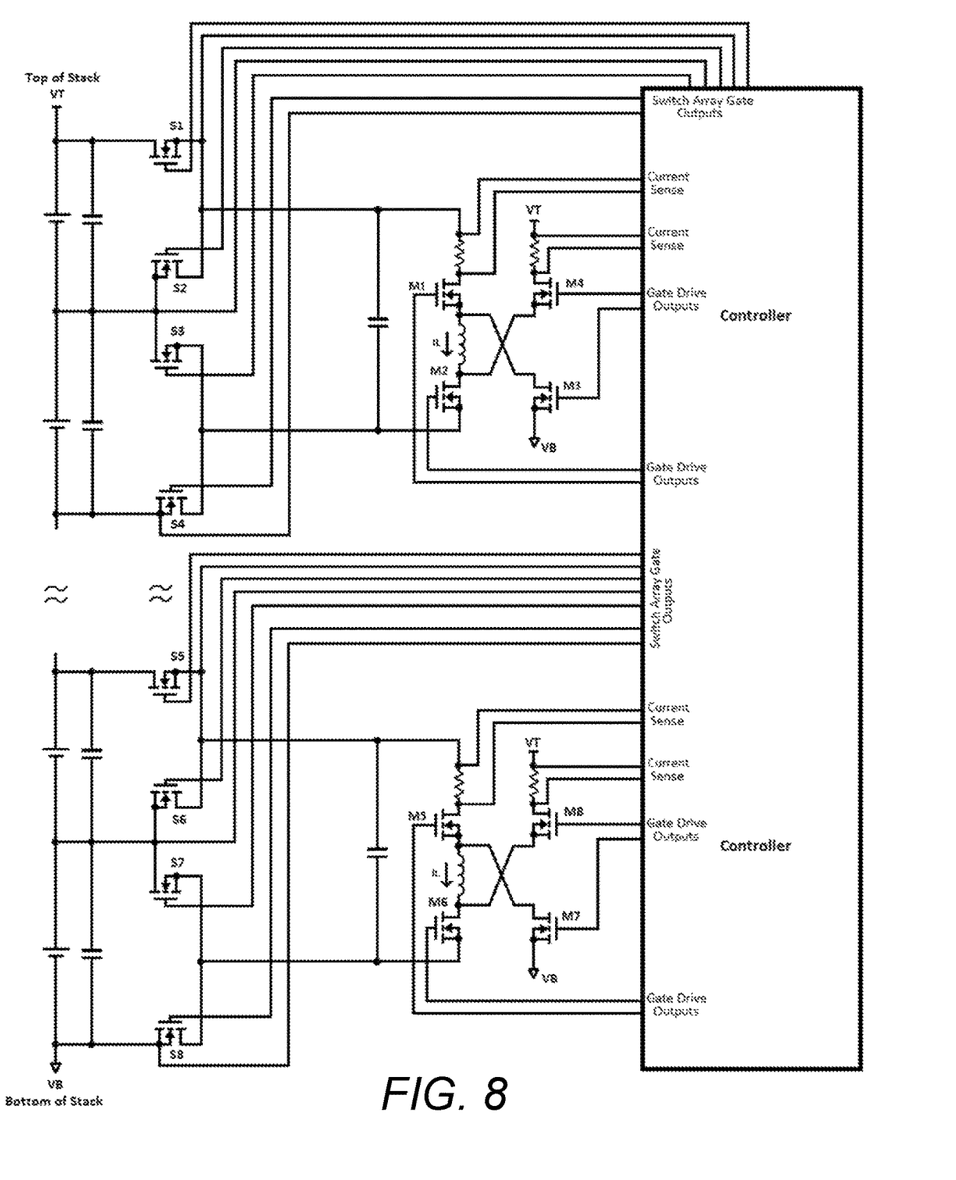
FIG. 8 illustrates an example of an energy storage stack balancing circuit in which more than one power converter unit per cell may be in a stack, but in which there may be less than one power converter for each cell.

FIG. 8 illustrates an example of an energy storage stack balancing circuit in which more than one power converter unit per cell may be in a stack, but in which there may be less than one power converter for each cell. In this particular case, one power converter unit may be time multiplexed between two cells. The switch array formed by S1-S8 may have less switching elements, because only two cells may be time multiplexed into a single power converter unit.

FIG. 8 shows a more specific case of the variation shown in FIG. 7. Here, the array of switches to selectively choose a cell may be far simpler and may only choose one of two adjacent cells. One power converter unit may be required for each two cells in the stack. The benefit of this type of system may be a lower number of FETs needed to implement the array of switches to choose which cell is desired. Other cases exist, such as sharing a power converter unit with 3 cells or 4 cells or more. In some of these cases, the switch matrix can be simpler then the permutation shown in FIG. 7.

The various approaches that have been described may provide one or more of the following advantages:

No transformer may be needed.
There may be bi-directional power flow.
The level of control may be very simple.
All phases in the stack may operate at nearly the same duty cycle.
Only a single power conversion stage may be needed, thus providing good efficiency.
For unidirectional power flow, M1/M2 or M3/M4 may instead be diodes.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the FETs shown in the figures can easily be made of other type of switching elements, including, but not limited to, bipolar devices, GaN Fets, relays, FETs that are implemented in an integrated circuit device, discrete power FETs, back-to-back dual FETs, or silicon carbide devices, to name just a few.

In the control of the timing of the FETs shown in FIG. 2 and FIG. 3, many variations may be provided. For example, the timing of the FETs can be accomplished with continuous conduction mode (CCM) techniques. This means that for the discharge case, the inductor current can always stay positive, instead of the boundary mode case where the inductor current may be purposely driven negative for one of the switching transitions. The benefit of CCM may result in a higher utilization of the inductor, resulting in more average discharge current per unit volume of inductor material. The drawback may be that switching losses in the FETs themselves can be higher. Similarly, CCM mode can be used in the charging of the cell. Now, the inductor current may always be negative. Utilization of the inductor may be higher than in boundary mode, but FET switching losses may be greater.

The method of sensing the current shown in FIGS. 1-8 are only examples of the methods that can be used. The currents can be sensed in the drain or sources of the FETs, or directly in the inductor. Sensing in the FETs can accomplished in any or all of the four FETs shown. Sensing of the inductor can be done on either side of the inductor with a sense resistor. Inductor current sense can also be accomplished with inductor DC resistance (DCR) sensing, wherein the parasitic winding resistance of the inductor may be used as the sensing element.

In the one directional circuits as shown in FIG. 4 and FIG. 5, Schottky diodes are shown. These could instead be silicon diodes, silicon carbide diodes, or other types of rectifying elements.

In the switch array method, FIG. 7 and FIG. 8 show FET switches being used. Again, these switches can be made of other type of elements, including, but not limited to, mechanical relays, bipolar devices, IGBTs, or SCRs, to name a few.

In the switch array methods shown in FIG. 7 and FIG. 8, a direct connection is shown between the controller and the gate or control terminal of the switch. Other methods exist where this connection can be an isolated connection where an element including, but not limited to, an optocoupler is used instead.

The controller and any number of the switching elements, both switch array switches and switches in the power converter unit, may be implemented in a single integrated circuit. Alternatively, the elements may be implemented in separate pieces of silicon or even in discrete circuit elements. Other combination may be implemented where some of the elements are incorporated into an integrated circuit, while others are implemented in discrete form.

The controller may be a full analog controller, digital controller, or mixed signal controller. Mixed signal implementation means parts of the control may be implemented in the digital realm and others in the analog realm.

A subset of energy storage elements within a stack can be grouped into a module and the stack can be made up of a series connection of modules. The energy transfer can thus be made between cell to module, module to cell, sub-set of cells within a module to the module, module to sub-set of cells within the module, or sub-set to a different sub-set within a module or vice-versa.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An energy storage stack balancing circuit for balancing a set of serially connected energy storage devices, the balancing circuit comprising:
   an electronic switching system that controls a delivery of energy into and out of an inductor; and
   a controller configured to control the electronic switching system so as to cause energy to be transferred from a selected one or more of the serially connected energy storage devices into the inductor, and then out of the inductor concurrently into a plurality of other energy storage devices in the serially connected energy storage devices.

2. The energy storage stack balancing circuit of claim 1, wherein each of the serially connected energy storage devices includes at least one of a battery or a capacitor.

3. The energy storage stack balancing circuit of claim 1, wherein the electronic switching system includes four electronic switches.

4. The energy storage stack balancing circuit of claim 3, wherein:
   the inductor has a first and a second connection;
   two of the electronic switches are connected to the first connection of the inductor; and
   the other two of the electronic switches are connected to the second connection of the inductor.

5. The energy storage stack balancing circuit of claim 1, wherein the controller is further configured to cause energy to be transferred from one of the energy storage devices into the inductor and then out of the inductor and into a different one, a subset, or all, of the energy storage devices.

6. The energy storage stack balancing circuit of claim 1, wherein the controller is further configured to cause energy to be transferred from all of the serially connected energy storage devices into the inductor and then out of the inductor and into a respective one, or a subset, of the serially connected energy storage devices.

7. The energy storage stack balancing circuit of claim 1, wherein the controller causes energy to be transferred:
   during a first time period, from a first of the serially connected energy storage devices into the inductor and then out of the inductor and into a first plurality of energy storage devices; and
   during a second time period, from a second of the serially connected energy storage devices into the inductor and then out of the inductor and into a second plurality of energy storage devices.

8. The energy storage stack balancing circuit of claim 1, wherein the controller is further configured to cause energy to be transferred:
   during a first time period, from the selected one or more of the serially connected energy storage devices into the inductor and then out of the inductor and into the plurality of energy storage devices and, during a second time period, from one or more of the plurality of energy storage devices into the inductor and then out of the inductor and into the selected one or more of the serially connected energy storage devices.

9. The energy storage stack balancing circuit of claim 1, wherein the controller is further configured to cause energy to be transferred during a first time period, from all of the serially connected energy storage devices into the inductor and then out of the inductor and into one or a subset of the serially connected energy storage devices and, during a second time period, from the one or the subset of the serially connected energy storage devices into the inductor and then out of the inductor and into all of the serially connected energy storage devices.

10. The energy storage stack balancing circuit of claim 1, wherein the controller is further configured to cause energy to be transferred:
    during a first time period, from the selected one or more devices of the serially connected energy storage devices into the inductor and then out of the inductor and into the plurality of energy storage devices and, during a second time period, from one or more of the plurality of energy storage devices into the inductor and then out of the inductor and into the selected one or more devices;
    during a third time period, from a subset of the serially connected energy storage devices into the inductor and then out of the inductor and into the plurality of energy storage devices and, during a fourth time period, from one or more of the plurality of energy storage devices into the inductor and then out of the inductor and into the subset of the serially connected energy storage devices; and
    during a fifth time period, from all of the serially connected energy storage devices into the inductor and then out of the inductor and into one or a subset of the serially connected energy storage devices and, during a sixth time period, from the one or the subset of the serially connected energy storage devices into the inductor and then out of the inductor and into all of the serially connected energy storage devices.

11. The energy storage stack balancing circuit of claim 1, wherein the circuit includes a separate inductor and a separate electronic switching system associated with each of the energy storage devices.

12. The energy storage stack balancing circuit of claim 1, wherein the electronic switching system includes two electronic switches and two diodes.

13. The energy storage stack balancing circuit of claim 12, wherein the inductor is connected to the two electronic switches and to the two diodes.

14. The energy storage stack balancing circuit of claim 1, wherein the circuit excludes a transformer.

15. An energy storage stack balancing system, comprising:
    means for selecting an energy storage device from a set of energy storage devices means that are coupled to each other; and
    means for transferring energy from the selected energy storage device via an inductor means concurrently to a plurality of other energy storage devices in the set of energy storage devices means.

16. The system of claim 15 further comprising:
    means for transferring the energy from the selected energy storage device to the inductor during a first time period; and
    means for transferring the energy from the inductor concurrently to the plurality of energy storage devices during a second time period.

17. The system of claim 15, wherein the set of energy storage devices are serially connected.

18. The system of claim 15 further comprising means for transferring energy from all of the set of energy storage devices into the inductor and then out of the inductor and into a respective one, or a subset, of the set of energy storage devices.

19. The system of claim 15 further comprising means for transferring energy from at least one of the plurality of the other energy storage devices to the selected energy storage device.

20. A machine-implemented method, comprising:
   selecting an energy storage device from a set of energy storage devices that are coupled to each other; and
   transferring energy from the selected energy storage device via an inductor concurrently to a plurality of other energy storage devices in the set of energy storage devices.

21. The method of claim 20 further comprising:
   transferring the energy from the selected energy storage device to the inductor during a first time period; and
   transferring the energy from the inductor concurrently to the plurality of energy storage devices during a second time period.

22. The method of claim 20, wherein the set of energy storage devices are serially connected.

23. The method of claim 20 further comprising transferring energy from all of the set of energy storage devices into the inductor and then out of the inductor and into a respective one, or a subset, of the set of energy storage devices.

24. The method of claim 20 further comprising transferring energy from at least one of the plurality of the other energy storage devices to the selected energy storage device.

\* \* \* \* \*